United States Patent [19]

Stevens et al.

[11] Patent Number: 5,008,602

[45] Date of Patent: Apr. 16, 1991

[54] SIGNAL GENERATOR FOR USE IN INDUSTRIAL POSITIONING SYSTEMS

[75] Inventors: Eugene H. Stevens, Newbury Park, Calif.; Mark W. Utlaut, Scappoose, Oreg.

[73] Assignee: Hughes Aircraft Company, Los Angeles, Calif.

[21] Appl. No.: 354,652

[22] Filed: May 19, 1989

[51] Int. Cl.$^5$ .............................................. G05B 13/00
[52] U.S. Cl. ................................... 318/561; 318/610; 318/256; 324/207.17
[58] Field of Search ................ 318/561, 610, 256, 609; 324/208

[56] References Cited

U.S. PATENT DOCUMENTS

| | | | |
|---|---|---|---|
| 3,241,015 | 3/1986 | Allen | 318/561 |
| 3,748,565 | 7/1973 | Wilson et al. | 318/609 |
| 3,819,999 | 6/1974 | Platt | 318/609 |
| 4,056,761 | 11/1977 | Jacoby et al. | 318/116 |
| 4,081,733 | 3/1978 | Anderson et al. | 318/609 |
| 4,170,754 | 10/1979 | Schmitz et al. | 324/208 |
| 4,283,667 | 8/1981 | Dinger | 318/256 |
| 4,422,025 | 12/1983 | Steller | 318/609 |
| 4,733,149 | 3/1988 | Culberson | 318/561 |

Primary Examiner—William M. Shoop, Jr.
Assistant Examiner—Saul M. Bergmann
Attorney, Agent, or Firm—P. M. Coble; W. K. Denson-Low

[57] ABSTRACT

A signal generator 16 is disclosed. The invention is adapted for use with industrial positioning systems and includes an integrating circuit 22 for integrating an input error signal to provide an output error signal and a limiting circuit 24, connected between the input and output of the integrating circuit 22 for limiting the output error signal. The output error signal is then used in a conventional manner to control a work piece or an implement. The integration of the low level input error signal rapidly increases the power delivered to the positioning system to overcome initial static friction. When the amplitude of the error signal indicates that the industrial apparatus is within a predetermined tolerance, the amplitude of output error signal decreases exponentially to diminish rapidly the power delivered to the positioning system. The apparatus will therefore be positioned within a given tolerance range.

9 Claims, 3 Drawing Sheets

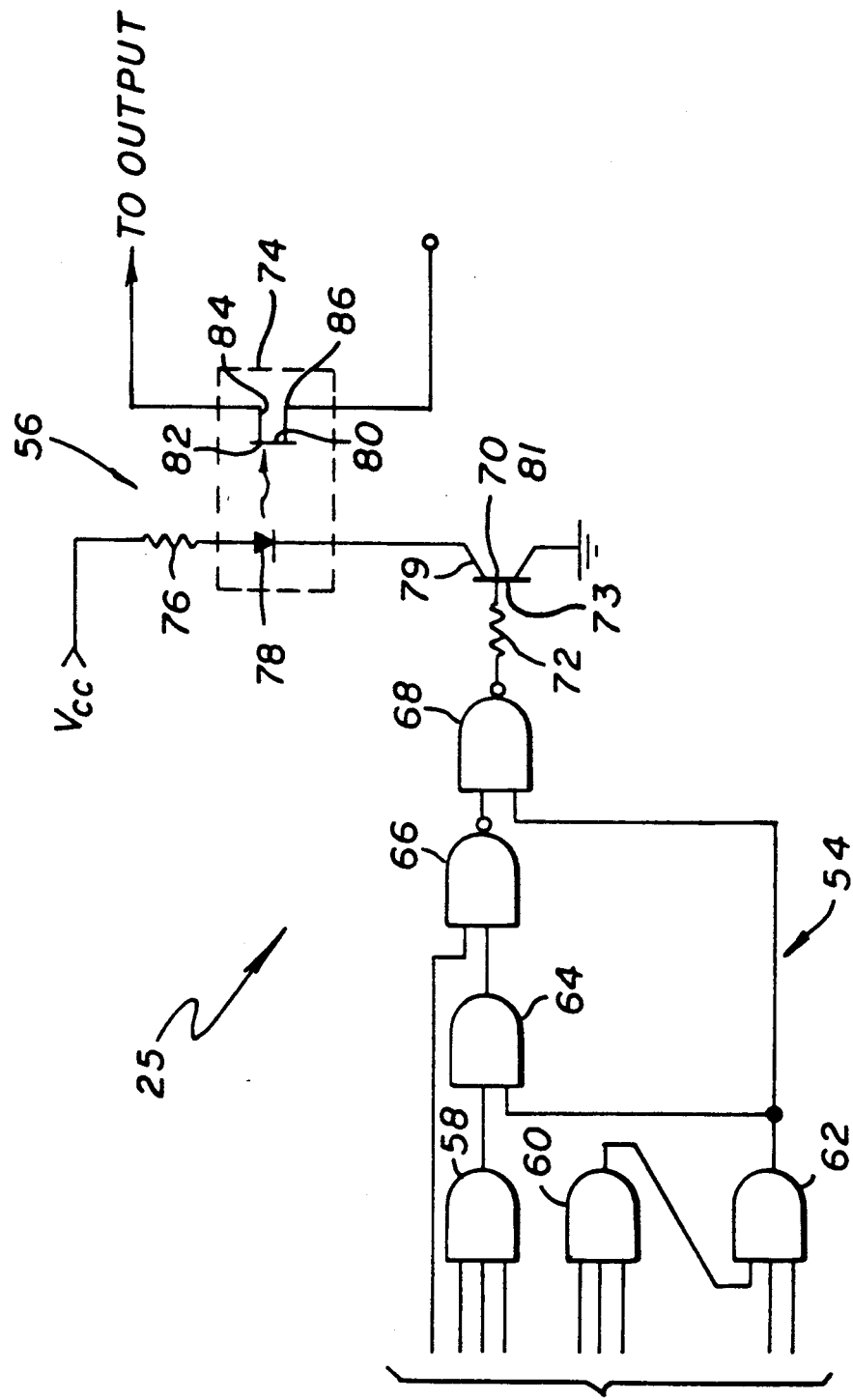

SIGNAL GENERATOR FOR USE IN INDUSTRIAL POSITIONING SYSTEMS

BACKGROUND OF THE INVENTION

1. Field of the Invention

The present invention relates to positioning systems. More specifically, the present invention relates to systems for the detection and correction of spatial errors in the position or alignment of an industrial apparatus.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In manufacturing, a variety of apparatus need to be positioned or aligned with respect to a reference or ideal position. Such alignment may be necessary to process a plurality of work pieces and ensure consistency and quality of manufacture. Accordingly, industrial positioning systems have been developed to provide automated positioning of a work piece relative to a tool or other implement. Such industrial positioning systems typically include error detection and correction systems to optimize the performance of the positioning system.

A common type of error detection and correction system adjusts the position of the work piece in response to an error signal. The error signal is often an analog signal which is developed by a detection device as a linear function of the spatial error between the actual position of the piece and a desired or reference position. As the spatial error decreases, the amplitude of the error signal decreases. Ideally, power to the positioning system should decrease to zero as the amplitude of the error signal decreases to zero. Should the piece subsequently become misaligned, an error signal having the same linear proportionality to the spatial error would again be developed. Through feedback, the stability at the reference position is ideally maintained.

Unfortunately, in most mechanical systems, static and dynamic friction operate to impair the performance of the system. For example, in the typical industrial positioning system, the amplitude of the error signal, for relatively small spatial errors, may be insufficient to supply enough power to the mechanical driver to overcome static friction in the system. Thus, notwithstanding the detection of a spatial error in the alignment of the piece and the development of an appropriate error signal, the misalignment may not be corrected as the signal level may have been too low to overcome the effect of friction.

Mechanical and electrical solutions have been proposed to counteract the effects of static friction. These approaches have tended to either impair the performance of the system or substantially increase the cost thereof. For example, an electrical solution to the problem compensates for static friction by adding a constant offset voltage to the error signal. An inherent limitation of this approach is due to the fact the offset voltage is constant and monopolar regardless of the error signal amplitude and sign.

A further limitation on this approach is due to the fact that the offset voltage has to be precisely calibrated to the mechanical backlash of the system in addition to the static friction. (Mechanical backlash results from an overshoot of the desired position caused by momentum in the mechanical implement or piece under movement. This causes another error signal to be generated which forces the implement or piece to be moved rapidly in the reverse position toward the desired position.) Calibration is critical as the presence of the offset voltage could otherwise cause the summed voltage to have a zero amplitude even though there is a spatial error. Yet such precise matching requires costly and extensive field adjustment by trial and error.

These problems are particularly acute in certain applications, such as focused ion beam semiconductor manufacturing systems, requiring a high degree of accuracy in the alignment of a work piece or sample relative to an implement or tool. There is therefore a need in the art for an inexpensive yet effective system and/or technique for controlling the position of a work piece or sample relative to an industrial implement.

SUMMARY OF THE INVENTION

The need in the art is addressed by the signal generator of the present invention. The invention is adapted for use with industrial positioning systems and includes an integrating circuit for integrating an input error signal to provide an output error signal and a limiting circuit, connected between the input and output of the integrating circuit for limiting the output error signal. The output error signal is then used in a conventional manner to control a work piece or an implement. The integration of the low level input error signal rapidly increases the power delivered to the positioning system to overcome initial static friction. When the amplitude of the error signal indicates that the industrial apparatus is within a predetermined tolerance, the amplitude of output error signal decreases exponentially to diminish rapidly the power delivered to the positioning system. The apparatus will therefore be positioned within a given tolerance range.

In a specific embodiment, a positioning system is disclosed which includes a position and error detection circuit for detecting the position of an article relative to a frame of reference and providing a position error signal in response thereto; a nonlinear signal generator circuit for providing a nonlinear output error signal in response to the error signal; and a positioning circuit for positioning the article relative to the frame in response to the output error signal. The output error signal is a nonlinear function of the input error signal. The nonlinearity of the output error signal allows an industrial apparatus to be moved by electro-mechanical devices within prescribed tolerance limits with appropriate compensation for static friction.

BRIEF DESCRIPTION OF THE DRAWINGS

FIG. 3 is a schematic diagram of the nulling circuit utilized in the illustrative embodiment of the present invention.

DESCRIPTION OF THE INVENTION

Figure 1:
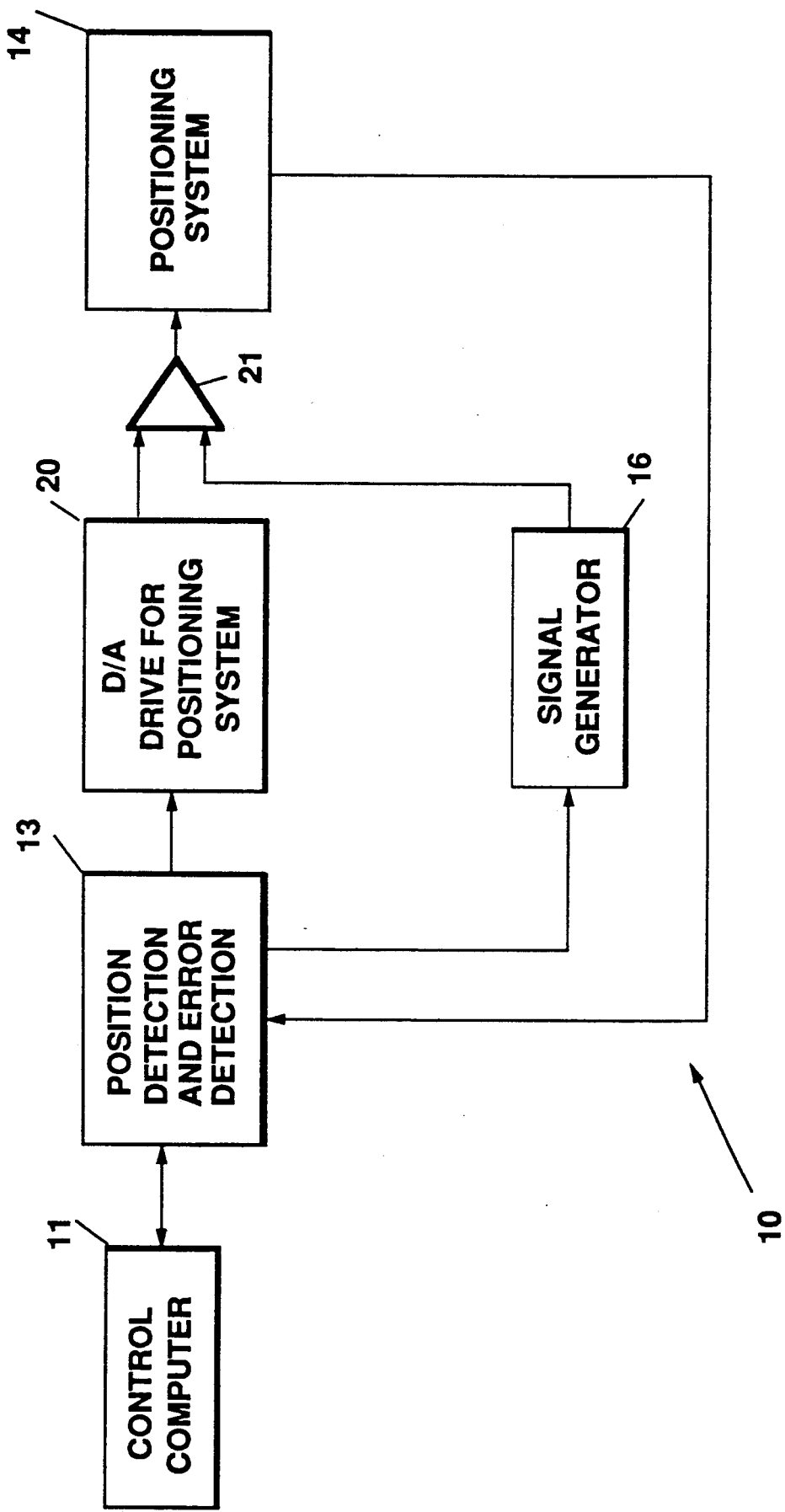
FIG. 1 is block diagram of a positioning system incorporating the principal teachings of the present invention.

FIG. 1 is block diagram of a positioning system 10 incorporating the principal teachings of the present invention. The positioning system 10 includes a control processor 11, a position and error detection circuit 13 for developing an error signal as a function of a detected spatial error between the actual position of an industrial apparatus, implement or work piece (hereinafter 'apparatus') and a desired reference position, a digital-to-analog (D/A) drive 20 and an amplifier 21. A positioning system 14 is included for positioning the apparatus to the reference position. A signal generator 16 is interposed between the position and error detection circuit and the positioning system 14. The signal generator 16 is responsive to the error signal and develops an output error signal as a nonlinear function thereof. The nonlinear output error signal developed by the signal generator 16 shapes the error signal from the position and error detection circuit so that the power delivered to the positioning system 14 is sufficient to overcome any initial static friction, associated with the object to be moved, and to remove power when the apparatus is within tolerance.

The position and error detection circuit 13 and the positioning system 14 are conventional, known elements. The description hereinbelow of the position and error detection circuit 13 and the positioning system 14 is not intended to limit the application of the present invention, but is intended to enable one skilled in the art to appreciate the present invention by providing a description of exemplary devices. In the illustrative embodiment of FIG. 1, the position and error detection circuit 13 may include a laser, interferometers and a comparator such as that provided in a laser system currently manufactured and sold by the Hewlett Packard Corporation. The position and error detection circuit 13 detects the error in the position of the apparatus with respect to a reference position and develops a digital signal which is representative of that error. The digital signal contains both magnitude and sign, or direction, information with respect to the alignment error.

The digital signal output of the position and error detection circuit 13 is applied to the D/A converter 20 which converts the digital signal into an analog error signal. The analog error signal has a magnitude which is linearly proportional to the magnitude of the detected error in position of the apparatus and further has a polarity which is dependent upon the sign information of the digital signal. The sign information conveys information of the direction of the linear or radial detected error. The analog error signal thus provides an input error signal for the signal generator 16.

The positioning system 14 may be any appropriately designed electro-mechanical stage which is adapted to receive the industrial apparatus of interest to the user of the present invention. Typically, the positioning system 14 includes electro-mechanical devices such as one or more electric motors whose output shafts are geared to an attachment of the industrial apparatus to provide linear or rotational motion along or about any reference axis. There are many commercially available devices which are appropriate to use in the positioning system 14. The device selected will of course depend upon the application.

Figure 2:
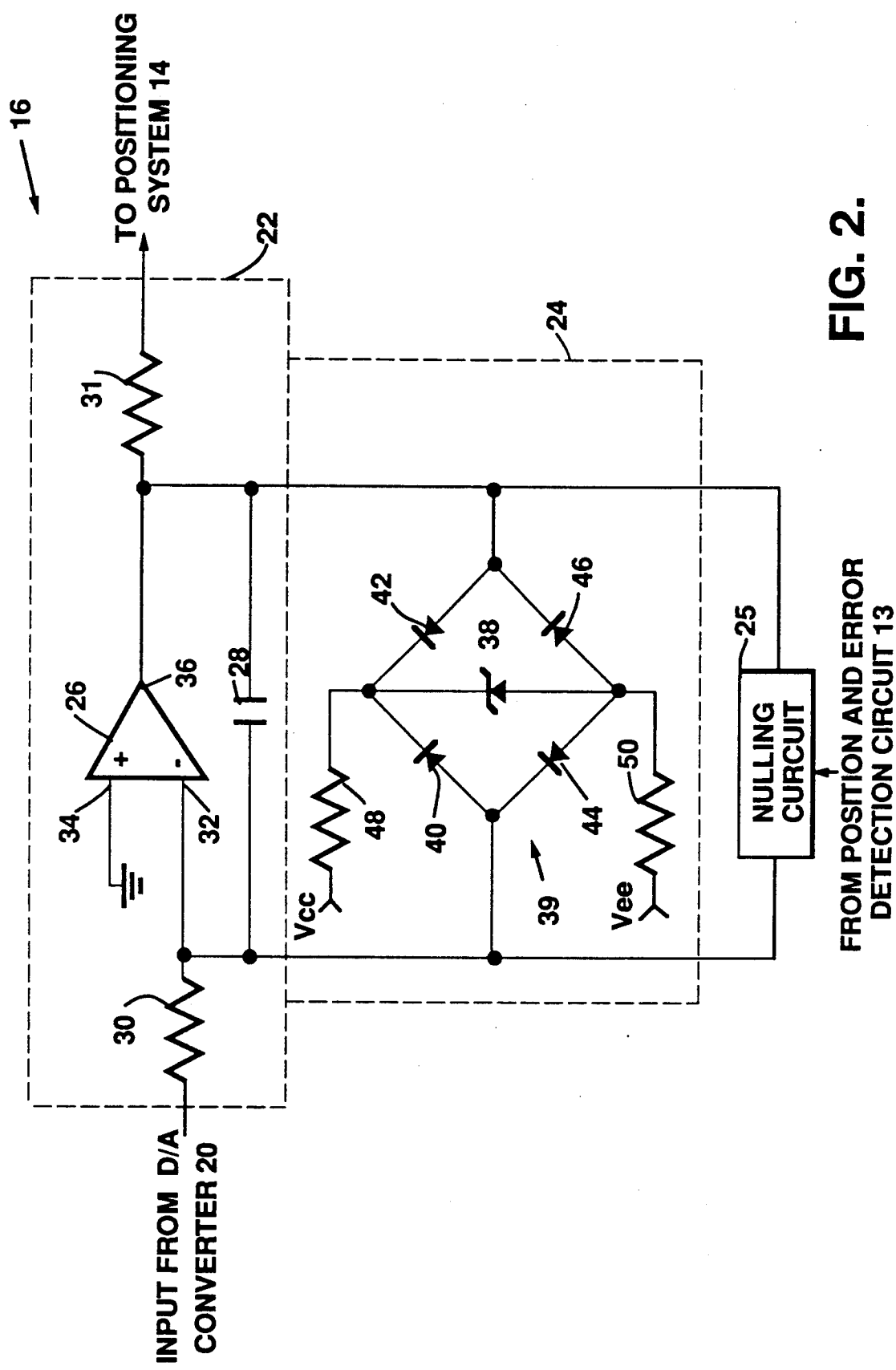
FIG. 2 is a schematic diagram of an illustrative embodiment of the signal generator of the present invention.

FIG. 2 is a schematic diagram of an illustrative embodiment of the signal generator 16 of the present invention. The signal generator 16 includes an integrating circuit 22 for integrating the analog error provided by the D/A converter 20 to provide the output error signal, a limiter 24 for limiting the output error signal to a predetermined threshold, and a nulling circuit 25 for nulling the output error signal when the detected spatial error is within a predetermined tolerance of the reference position.

The integrating circuit 22 includes an operational amplifier 26, a capacitor 28, an input resistor 30 and an output resistor 31 configured to provide an integrator. The amplifier 26 has an inverting input 32, a noninverting input 34 and an output 36. The input resistor 30 is coupled between the output of the D/A converter 20 and the inverting input 32 of the amplifier 26 to couple the input analog error signal to the integrating circuit 22 of the nonlinear signal generator 16. The output resistor 31 is coupled between the output 36 of the amplifier 26 and the positioning system 14. The noninverting input 34 is normally biased to a reference or ground potential. The capacitor 28 and the input resistor 30 are chosen to provide a suitable time constant for the integrator 22. The output resistor 31 is chosen to match the impedance of the next circuit or system.

As the voltage of the analog error signal becomes greater or less than the reference potential, a current is developed in the input resistor 30. This applies the input analog error signal to the inverting input 32 of the amplifier 26. In response to the input analog error signal, the amplifier 26 develops voltage at the output 36 thereof which is an integral of the input voltage. While the design of the integrator 22 is well within the skill of one of ordinary skill in he art, the integrator 22 should be designed to ensure that the output error signal, developed by the integrator 22 and applied to the positioning system 14, is of sufficient power to overcome the initial static friction present within the electro-mechanical devices of the positioning system.

The limiter 24 is connected in parallel with the feedback capacitor 28 of the integrator 22. The limiter 24 includes a zener diode 38 and a diode bridge 39 having first, second, third and fourth diodes, 40, 42, 44, and 46, respectively. The zener diode 38 and the first and second diodes 40 and 42 are connected at the respective cathodes thereof. The zener diode 38, and the third and fourth diodes 44 and 46 are commonly connected at their anodes. The anode of the first diode 40 and the cathode of the third diode 44 are connected to the inverting input 32 of the amplifier 26. The anode of the second diode 42 and the cathode of the fourth diode 46 are connected to the output 36 of the amplifier 26. The limiter 24 includes a first bias resistor 48 coupled between ground and the cathode of the zener diode 38 and a second bias resistor 50 coupled between a lower bias potential $V_{ee}$ and the anode of the zener diode 38. The first and second bias resistors 48 and 50 are selected to minimize the reverse breakdown bias current.

The limiter 24 limits the voltage of the analog error signal between a maximum and a minimum threshold level. When a negative input voltage is applied to the input resistor 30, the corresponding output voltage of the integrator 22 will begin to rise, the rise time being determined by the inverse RC product of the input resistor 30 and the capacitor 28. When the output voltage becomes substantially equal to the reverse breakdown voltage of the zener diode 38, the second diode 42 and the third diode 44 become forward biased. This creates a current path which bleeds off the excess charge on the capacitor 28. Thus, as the charge stored in the capacitor 28 is limited, the output voltage of the amplifier 26 is limited to the breakdown voltage of the zener diode 38. The upper bias voltage $V_{cc}$ and the lower supply voltage $V_{ee}$ maintain the zener diode 38 in a reverse breakdown state. Similarly, when the input voltage applied to the input resistor 30 is positive, the negative output voltage developed at the output 36 is limited to the reverse breakdown voltage of the zener diode 38 when the first and fourth diodes 40 and 46 become forward biased.

As the position of the industrial apparatus is urged to the reference position, the input voltage applied to the input resistor 30 begins to decrease to zero. Without the limiter 24, the voltage of the output analog error signal would continue to increase even as the voltage of the input analog error signal decreases. The limiter 24, however, ensures that power delivered to the positioning system 14 is not increasing as the spatial error is decreasing. Thus, the integrating circuit 22 provides a high power level to overcome the mechanical friction inherent in the position system 14 and the limiter 24 maintains the power level constant.

After the input analog error signal from the position and error detection system 13 has returned to zero amplitude, the capacitor 28 may remain charged and cause the output analog error signal to have a non-zero amplitude. The residual charge on the capacitor 28 may cause power to be delivered to electro-mechanical devices in the positioning circuit 14 and result in overshoot of the reference position. Accordingly, the nulling circuit 25 is provided to ensure that power is removed from the positioning circuit 14 when the spatial error is within a preselected tolerance. The nulling circuit 25 is operative in response to the digital output from the error detector 13. The nulling circuit 25 is effective to develop a nulling signal for application to the integrating circuit 22 when the input signal indicates that the spatial error is within the prescribed tolerance. The integrating circuit 22 is then disabled in response to the nulling signal.

FIG. 3 is a schematic diagram of the nulling circuit 25 utilized in the illustrative embodiment of the present invention. The nulling circuit 25 includes a logic circuit 54 for detecting when the spatial error of the apparatus is within a predetermined tolerance and a switch 56 for disabling the integrator circuit 22 when the spatial error is within the predetermined tolerance. When the spatial error is within the predetermined tolerance, the logic circuit 54 develops a switching signal for actuation of the switch 56. In turn, the switch 56 shorts the capacitor 28 thus disabling the integrating circuit 22.

The logic circuit 54 includes a plurality of first AND gates 58, 60, and 62, a second AND gate 64, and a pair of NAND gates 66 and 68. The input bits are provided by a comparator (not shown) which would be included within the position and error detection circuit 13. The error signal is generated by computing where the system is and where it should be. If all inputs to the gates 58, 60, 62, 64, 66 and 68 are high then the integrator 22 is disabled. If any input is low, the integrator 22 is not disabled. Those skilled in the art will appreciate that the system could be designed to enable when the inputs are high and disable when the inputs are low by changing the logic and the FET switch 80.

The switch 56 includes a transistor 70, a base resistor 72 coupled between the NAND gate 68 and a base terminal 73 of the transistor 70, an opto-electric isolator 74 and a collector resistor 76. The opto-electric isolator 74 has a photodiode 78 serially connected with the collector resistor 76 between the upper bias voltage $V_{cc}$ and a collector 79 of the transistor 70, and a FET switch 80. An emitter 81 of the transistor 70 is coupled to reference or ground potential. The FET switch 80 has a gate 82 responsive to the optical radiation emitted by the photodiode 78, a drain 84 connected to the output 36 of the amplifier 26 and a source 86 connected to the inverting input 32 of the amplifier 26. The FET switch 80 thereby selectively shorts the capacitor 28 between the drain 84 and the source 86 thereof.

When the position of the industrial apparatus is within the predetermined tolerance, the output of the NAND gate 68 goes high, thereby developing the switching signal as a base drive current through the base resistor 72 to turn on the transistor 70. When the transistor 70 turns on, the voltage of the collector 79 of the transistor 70 drops, thereby forward biasing the photodiode 78. The resultant collector current is limited by the collector resistor 76. The photodiode 78, when forward biased, emits radiation incident upon the gate 82 to turn on the FET switch 80. The FET switch 80 saturates to develop the nulling signal at the drain 84 thereof such that the drain-to-source voltage collapses, thereby removing all charge from the capacitor 28. As is well known in the art, the voltage across the capacitor 28 will decrease exponentially.

Therefore, the nulling circuit 25 functions to reduce exponentially the power to electro-mechanical devices of the positioning circuit 14 when the industrial apparatus is within the predetermined tolerance. The positioning circuit 14 should absorb any remaining kinetic energy of the positioning circuit 14 so that it remains within such tolerances.

The present invention is particularly useful in focused ion beam systems A typical focused ion beam system focuses an ion beam to a predetermined location on a semiconductor substrate. In this illustrative application, the position and error detection circuit 13 detects the spatial error between the predetermined location on a semiconductor substrate to which the beam is incident. As described hereinabove, the position and error detection circuit 13 develops a digital signal commensurate with the spatial error. The D/A converter 20 converts the digital signal to an analog error signal which has a magnitude determined as a linear function of the spatial error and a polarity determined by the sign information of the digital signal. The signal generator 16 functions as described above. In such an application, the positioning circuit 14 is the focusing system of the ion beam system.

Thus, the present invention has been described herein with reference to an illustrative embodiment for a particular application. Those having ordinary skill in the art and access to the present teachings will recognize additional modifications applications and embodiments within the scope thereof. For example, the invention is not limited to the techniques or circuitry by which the integrating, limiting and nulling functions are performed. Further, other techniques and systems may be employed to generate an output error signal which is nonlinear with respect to an input error signal. The invention is not limited to the technique by which the nulling signal is applied. Nor is the invention limited to any particular application.

It is therefore intended by the appended claims to cover any and all such applications, modifications and embodiments within the scope of the present invention.

Accordingly,
What is claimed is:

1. A signal generator comprising:
   integrating means for integrating an input signal to provide an output signal;
   limiting means, connected between the input and output of said integrating means for limiting the output thereof; and
   nulling means coupled to the output of said integrating means for nulling the output signal of said integrating means when the input to said integrating means drops below a first predetermined threshold.

2. The invention of claim 1 wherein said integrating means includes:
   a differential input, operational amplifier;
   a resistor coupled between the input of said integrating means and an input to said operational amplifier;
   and a capacitor coupled between the output of said operational amplifier and said input to said operational amplifier.

3. The invention of claim 2 wherein said limiting means includes:
   a diode bridge having first, second, third and fourth nodes and first, second, third, and fourth diodes connected therebetween, said first and third nodes being connected to the input and the outputs respectively of said integrating means and
   zener diode means for providing current flow between the second and fourth nodes of said diode bridge when the voltage between said second and fourth nodes exceeds a second predetermined threshold.

4. The invention of claim 1 wherein said nulling means includes:
   switching logic means for controlling the activation of switch means;
   said switch means being included for selectively nulling the output of said integrating means in response to the output of said switching logic means.

5. A positioning system comprising: position and error detection means for detecting the position of an article relative to a frame of reference and providing a position error signal in response thereto;
   signal generator means for providing an output signal in response to said error signal, said signal generator means including integrating means for integrating said error signal to provide said output signal, limiting means coupled between the input and output of said integrating means for limiting the output thereof, and nulling means coupled to the output of said integrating means for nulling the output signal of said integrating means when the input to said integrating means drops below a predetermined threshold; and
   positioning means for positioning said article relative to said frame in response to said output signal.

6. The invention of claim 5 wherein said integrating means includes:
   a differential input operational amplifier;
   a resistor connected between the input of said integrating means and an input to said operational amplifier;
   and a capacitor connected between the output of said operational amplifier and said input to said operational amplifier.

7. The invention of claim 5 wherein said limiting means includes:
   a diode bridge having first, second, third and fourth nodes and first, second, third, and fourth diodes connected therebetween, said first and third nodes being connected to the input and the outputs respectively of said integrating means and
   zener diode means for providing current flow between the second and fourth nodes of said diode bridge when the voltage between said second and fourth nodes exceeds a second predetermined threshold.

8. The invention of claim 5 wherein said nulling means includes:
   switching logic means for controlling the activation of switch means,
   said switch means being included for selectively nulling the output of said integrating means in response to the output of said switching logic means.

9. A method for positioning an article relative to a frame including the steps of:
   (a) detecting the position of an article relative to a frame of reference and providing a position error signal in response thereto;
   (b) providing an output signal in response to said error signal by integrating said error signal to provide said output signal, limiting said output signal, and nulling said output signal when said error signal drops below a predetermined threshold; and
   (c) positioning said article relative to said frame in response to said output signal.

* * * * *